United States Patent [19]

Jansson

[11] Patent Number: 4,890,976
[45] Date of Patent: Jan. 2, 1990

[54] WIND TURBINE

[76] Inventor: Peter Jansson, 33 Penkivil Street, Willoughby, New South Wales, 2068, Australia

[21] Appl. No.: 349,909

[22] Filed: May 9, 1989

Related U.S. Application Data

[63] Continuation of Ser. No. 125,589, Nov. 25, 1987, abandoned.

[51] Int. Cl.⁴ .............................................. F03D 1/04
[52] U.S. Cl. ................................ 415/4.4; 416/197 A
[58] Field of Search ............................................. 415/4.4

[56] References Cited

U.S. PATENT DOCUMENTS

| | | | |
|---|---|---|---|
| 282,122 | 7/1883 | Schramm | 416/DIG. 6 |
| 2,812,823 | 11/1957 | De Oviedo | 416/197 A X |
| 4,191,505 | 3/1980 | Kaufman | 415/2 R |
| 4,279,569 | 7/1981 | Harloff | 415/3 R X |
| 4,295,783 | 10/1981 | LeBost | 415/2 R |

FOREIGN PATENT DOCUMENTS

| | | | |
|---|---|---|---|
| 141841 | 1/1949 | Australia | 415/2 R |
| 365045 | 6/1906 | France | 415/3 R |
| 575173 | 7/1924 | France | 415/3 R |
| 789837 | 11/1935 | France | 415/3 R |
| 2291379 | 6/1976 | France | 416/DIG. 6 |
| 2453287 | 12/1980 | France | 415/3 R |
| 2505939 | 11/1982 | France | 416/197 A |
| 478646 | 2/1953 | Italy | 416/DIG. 6 |
| 162776 | 9/1983 | Japan | 416/197 A |
| 180076 | 10/1984 | Japan | 416/197 A |
| 985402 | 12/1982 | U.S.S.R. | 415/2 R |
| 1204777 | 1/1986 | U.S.S.R. | 415/2 R |
| 2067247 | 7/1981 | United Kingdom | 416/119 |

Primary Examiner—Everette A. Powell, Jr.
Attorney, Agent, or Firm—Birch, Stewart, Kolasch & Birch

[57] ABSTRACT

The invention relates to a wind driven turbine, which includes a rotor having a plurality of spaced apart vanes. The rotor is adapted to rotate about the vertical axis of an elongate short which can transmit power to a prime mover or power take off. Each vane for the rotor is formed with a substantially concave, elongate trailing or reverse face. Wind deflecting means are provided for directing wind through a venturi, onto and along the concave trailing face of one or more vanes, as the one more vanes rotate downwind away from the venturi. The wind deflecting means can also assist in at least partially shielding from the wind, one or more vanes of the rotor, as the vanes rotat and move upwind towards the venturi.

3 Claims, 3 Drawing Sheets

WIND TURBINE

This application is a continuation, of application Ser. No. 125,589 filed on Nov. 25, 1987, now abandoned.

BACKGROUND TO THE PRESENT INVENTION

This invention relates to a wind driven turbine and in particular to a wind driven turbine comprising a plurality of vanes which are arranged to rotate about a vertical axis.

Wind driven turbines and windmills have been known and used for many years, for example to pump water from boreholes on farms and in country areas.

Previously known turbines and windmills, which have rotated about a substantially horizontal axis, have had vertical vanes and have had the advantage that the vanes generate torque at all angular positions as they rotate. It has been found however, that a tower is normally necessary to provide ground clearance for such vanes. This has presented problems in that such vanes are often inaccessible for maintenance and repair. Further, such turbines have not always been as efficient and operable as operators and users would like.

Wind driven turbines and windmills which rotate about a substantially vertical axis are also known, although one disadvantage with known vertical axis turbines is that the vanes of rotors travelling in the direction of the wind often tend to shield one another, so that it is often inefficient and frustrating to use a multi-vane rotor. Further, in known vertical axis turbines the vanes of rotors, travelling into the wind on one side of the rotor, usually exert a torque opposite to that desired. Although this is reduced if the vanes are concave on one side and convex on the other, (the concave surface of the vane producing the dominant torque), the drag exerted on the rotor caused by the movement of the convex vane surfaces into the wind,, is often considerable Certainly such drag adversely affects the efficiency of such turbines.

It is an object of this invention to go at least some way towards overcoming or at least minimizing the above problems and to at least provide the public with a reasonable choice.

SUMMARY OF THE PRESENT INVENTION

According to one aspect of this invention there is provided a wind turbine comprising a vaned rotor, rotatable about a vertical axis, each vane of said rotor being formed with an elongate concave trailing face; wind deflection means being provided and including or forming a venturi, such that wind is gathered and directed into and through said venturi, against a concave, trailing face of at least one vane on one side of said rotor, said vane being adjacent to and rotating away from said venturi.

BRIEF DESCRIPTION OF THE ACCOMPANYING DRAWINGS

The invention will now be described by way of example only, with reference to the accompanying drawings, wherein.

DETAILED DESCRIPTION OF PREFERRED EMBODIMENTS

Figure 1:
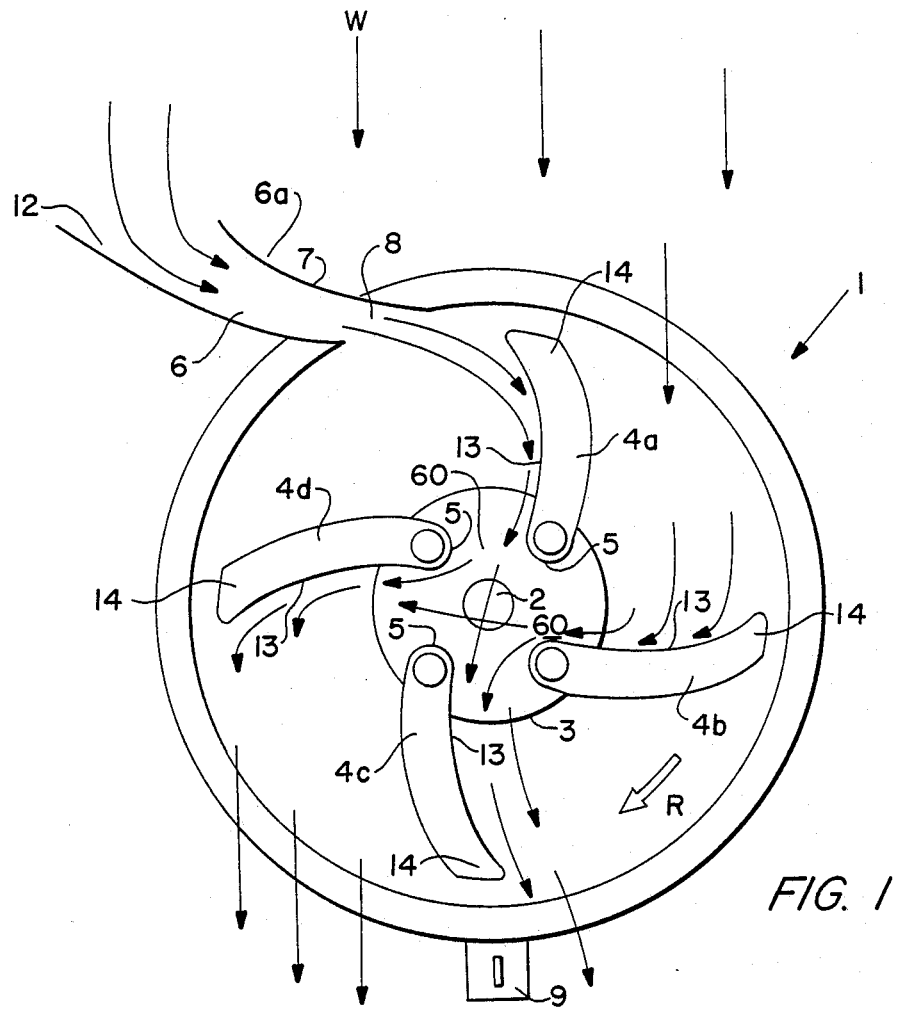
FIG. 1 is a sectional plan and generally schematic view of a turbine and its operation, according to one form of the invention.

The invention will now be described by way of example only and with particular reference to the accompanying drawings.

The turbine of the present invention includes a rotor member or plate 3, and plurality of spaced apart and horizontally extending vanes 4. In the form of the invention shown, there are four vanes 4 provided, although if desired only one pair of vanes could be provided. Alternatively more than two pairs of vanes can be provided if desired.

The vanes 4 are connected at their butt ends 5 to, (and extend outwardly from) the rotor plate 3 to which they are suitably mounted. The rotor plate 3 is adapted to rotate about a vertical axis, such as on an appropriate shaft or axle. In one form of the invention two vertically spaced apart rotor plates 3 may be provided, the butt ends 5 of the vanes 4 being located and secured therebetween by suitable securing means.

The elongate shaft or axle is preferably adapted to impart power to a power take off, prime-mover, pump, generator or the like, as it rotates with the rotation of the rotor and vanes.

In a preferred form of the invention there are two pairs of vanes, being vanes 4a and 4c on the one hand and vanes 4b and 4d on the other hand. Each of the pairs of vanes is located and attached on an opposite side of the rotor 3.

It should be appreciated that if desired only one pair of vanes (for example vanes 4a and 4c) may be utilized. Alternatively more than two pairs of vanes can be utilized.

The butt ends 5 of the vanes 4 are preferably connected to the rotor plate 3 such that the butt ends 5 are juxtaposed relative to each other and slightly staggered relative to each other. This will be readily apparent from FIG. 1 of the accompanying drawings.

Each vane 4 is elongate in formation and of a generally arcuate and curvilinear shape, the trailing faces of each vane 4 being concave and elongate, the concave trailing surface 13 of each vane 4 preferably diminishing in depth towards its outer trailing end which is dished at, or adjacent, its outer end (as at 14 in FIG. 1).

The present invention further provides wind deflecting means 6a which is suitably provided on at least one side of the rotor 3 and which serves to deflect and channel incident wind through a venturi 8, so that the wind passes through the venturi 8 to be discharged onto the vanes 4 as they rotate past and away from the venturi.

The wind deflection means 6a includes, in one form, a framework carrying an air scoop, being at least two spaced apart concave walls, formed from an air scoop wall 6 and a curved shell 7, the scoop 6 and a shell 7 being so located and spaced from each other that they define an inlet 12 at one end and a restricted outlet or venturi 8 at the other end.

In a preferred form of the invention a track or mounting rail of a substantially circular formation extends about the rotor 3 the wind deflection means 6a being mounted on rollers, runners or the like, so as to be capable of rotational movement relative to and about the rotor 3. As indicated, the outer ends of the scoop 6 and shell 7 define between them a mouth 12 to gather wind. In FIG. 1 of the accompanying drawings and by way of example, the wind direction is shown by the arrow 'W' and direction of rotation of the rotor 3 is shown by the arrow 'R'.

The height of the scoop 6 is preferably such that it at least partially shields some of the rotor vanes 4, as they rotate essentially upwind, and as they move towards the venturi 8, the scoop 6 creating or forming a low pressure area behind said deflecting means 6a.

The wind deflecting means 6a is maintained with its mouth or opening 12 to the wind by rotating about the track. Change and movement is for example controlled by a wind direction sensing mechanism 9, for example a vertical wind vane or a fantail rotor, driving a pinion attached to the frame and meshing with a circular rack defining the track. Alternatively, the frame may be mounted on appropriate rollers, wheels, or guides.

Figure 2:
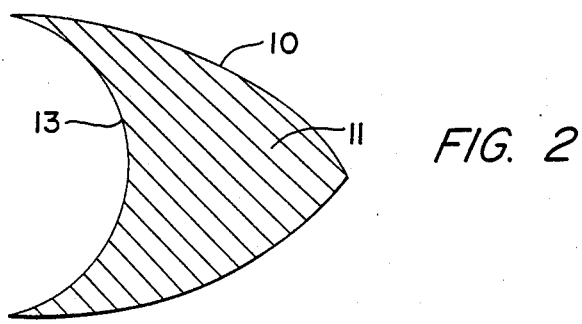
FIG. 2 is a cross-sectional view of a vane of the turbine according to one form the present invention.

Referring to FIG. 2 of the accompanying drawing, this shows a sectional view of a vane 4, with a substantially 'U' shaped trailing edge 13, the depth of which preferably diminishes towards its outer end, so as to be of a dished configuration. Thus, in use, air discharged from the venturi 8 against a trailing surface of a vane 4 is deflected along the 'U' shaped trailing surface 13 and is deflected radially inwardly along the profile, to its open inner or butt end 5.

The trailing surface 13 of the vane 4 is formed by a sheet adhering to a filling 11 of a general chevron cross section, such as for example balsa wood filling and the like. Other fillings may however be used. Such fillers are generally light and give structural strength to the vane 4. Alternatively, the vane may be hollow, the shape being formed by two layers or skins comprising an inner curved skin and an outer shell. The leading face of the vane is of a 'V' shape cross section, with sides 10 of the 'V' being outwardly bowed as shown in FIG. 2 of the drawings.

Operation of the wind operated turbine will now be described with particular reference to FIG. 1 of the accompanying drawings.

The mouth 12 of the deflecting means 6a is moved or maintained into a position facing a prevailing wind 'W' by a control mechanism 9 or some other appropriate means. The wind is incident on the concave trailing faces 13 of the vanes 4 as they emerge from behind the shelter of the scoop 6 and shell 7, forming the deflecting means 6a. The wind therefore drives the vanes 4 downwind causing the rotor 3 to rotate in the direction of the arrow 'R' as shown in FIG. 1. The scoop 6 of the deflecting means is preferably of such a size and height that it at least partially protects and shields the vanes 4 from the wind during their upwind movement and sweep, as they approach the venturi 8.

The scoop 6 and shell 7 are so mounted and held relative to each other, such that at their lower or inner ends they define a restricted outlet or venturi 8, through which the wind is forced. Some wind will also be incident on the outer surface of the shell 7 and this wind too will be deflected onto the trailing surfaces or faces 13 of the vanes 4 as they move past and away from the venturi 8.

The vanes 4 are so constructed that incident wind from the venturi is directed onto the concave faces thereof, such that wind being directed inwardly and radially along the concave trailing face 13 of a vane 4, is discharged from the inner or butt end 5 of the vane 4, some of the wind thereafter passing directly over onto the concave trailing face of the opposite vane. That is, a vane 4 which is advancing upwind towards the venturi 8 is within an at least partial shelter of the deflecting means 6a. This passage of wind, (originating from the venturi 8) across the trailing concave surfaces 13 of the vanes 4, adds substantial impetus to the vanes both as they go downwind away from the venturi 8 (as in the case of a vane 4a) and as they move around to go upwind towards the venturi 8 (as in the case of vane 4c). The generally low pressure area or zone, existing in the immediate lee of the scoop 6 enhances the effect of the thrust of the wind on the trailing surfaces 13 of the vanes 4. The relatively sharp profile of the substantially 'V' leading faces of the vanes 4 gives the vanes a relatively low resistance when travelling through the air. This therefore decreases resistance to the rotational movement of the vanes.

Referring further to FIG. 1 of the drawings, it should be appreciated that in addition to the incident wind from the venturi 8, passing down the trailing concave faces 13 of the vanes, additional normal wind flow will impinge upon and effect the trailing concave edges of at least one other vane 4. For example the vane 4b, immediately forward and rotating downwind of the vane 4a, against the trailing concave surface of which the venturi 8 is directing air. As shown in FIG. 1 of the drawings therefore, some normal wind will bear upon the trailing concave face 13 of an additional vane 4b and again some of that air will be caused to move directly over the rotor and outwardly against the trailing concave face of the opposite vane 4d, thus assisting the vane 4d in its rotational movement upwind and towards the venturi 8. In all cases however, because of the juxtaposition between the butt ends 5 of the vanes 4 and having regard to the rounded configuration of the butt ends 5 and the staggered and spaced relationship therebetween, restricted outlets or secondary venturis 60 tend to be formed between the butt ends 5 of the vanes 4 and in particular between the butt ends of the vanes 4d and 4a on the one hand and 4b and 4a on the otherhand. As indicated in FIG. 1 therefore, such restrictions will cause an internal secondary venturi effect, to the extent that a certain amount of the air passing down the concave surfaces 13 of the vanes 4a and 4b, will also be additionally forced by the secondary venturi effects (as at 60 in FIG. 1) not only against the trailing concave surfaces of the parallel vanes (in the case of vane 4a—the vane 4c and in the case of the vane 4b—the vane 4a), but wind will also be forced from the curved trailing faces (for example of vanes 4a and 4b) against the substantially perpendicular curved trailing faces of immediately adjacent vanes, being respectively the curved inner trailing faces of vanes 4c and 4d.

The secondary internal venturi is 60 and the resultant additional pressure on the curved trailing faces 13 of the vanes 4, assists further in the rotation of the vanes 4 and rotor 3, especially as the rotors move into a position in which they will travel upwind towards the venturi 8.

Figure 3:
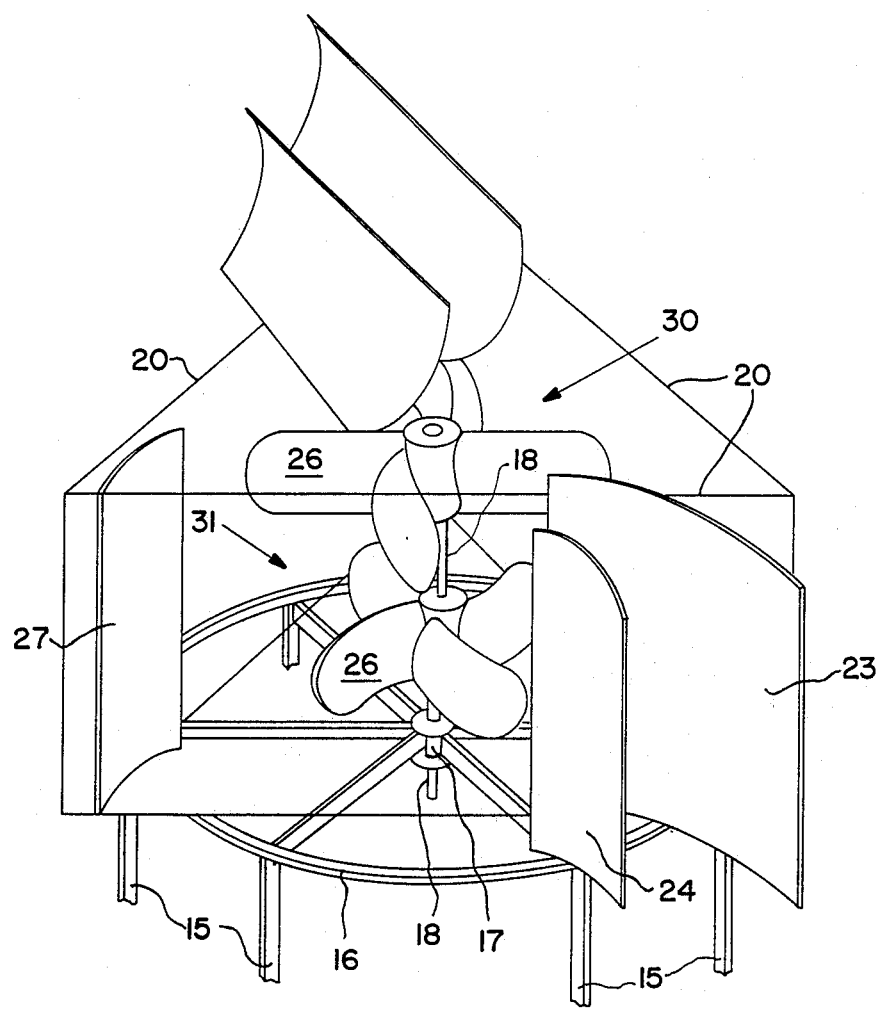
FIG. 3 is a general view showing a further form of the present invention.
Figure 4:
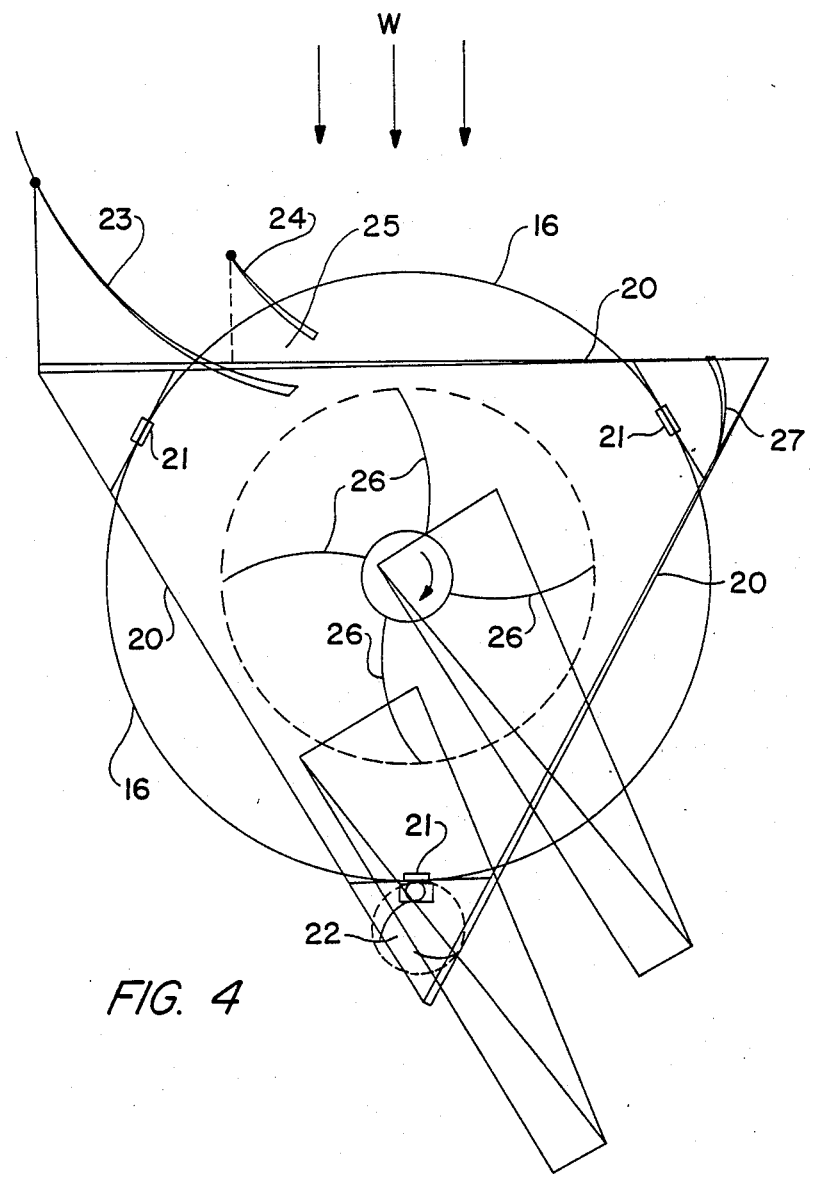
FIG. 4 is a planned view of the turbine shown in FIG. 3 of the accompanying drawings.

Referring now to FIGS. 3 and 4 of the accompanying drawings the show a form of the invention in which there are a plurality of (for example two) sets of vanes, one stacked on top of the other, operating on the same rotor shaft, and each having its own venturi.

The turbine shown in FIG. 3 of the drawings includes a frame 15 which supports a substantially horizontal rail 16, from which radial bars extend inwardly to a hub 17. A shaft 18 passes vertically through the hub 17 and provides a power take-off at its lower end.

A structure 20, of a substantially isosceles triangular shape, is provided and located substantially horizontally, as shown in FIG. 4 of the drawings. The structure 20 is rotatably mounted on the rail 16 by roller units 21, at least two of which are idlers, while a third is for example driven by some other appropriate rotatable means. For example a 'savonious' rotor 22.

It has been found that the structure 20 of a generally isosceles triangular shape, in a substantially horizontal plane is a particularly effective way of mounting the wind deflecting means or scoops. It has equal application therefore, to the wind deflecting means 6a as shown in FIG. 1 of the drawings or the deflecting means as shown in FIGS. 3 and 4 of the accompanying drawings.

Referring again to FIGS. 3 and 4 of the accompanying drawings, the structure carries on a windward side thereof, indicated by arrows, a major scoop plate 23 and a minor scoop plate 24 which form the wind deflecting means and define between them a venturi 25 for directing a stream of air onto the vertically spaced apart sets of rotor blades 26. On a windward side of the structure, for example opposite plates 23 and 24, a trim tab 27 may be provided of substantially the same size and profile as the minor scoop 24. This can be positioned to maintain the structure at a position at which the wind energy transferred to the shaft 18 is maximized.

The blades or vanes 26, shown in FIG. 3 of the drawings, are operated substantially as described with reference to FIGS. 1 to 2 of the drawings, and transmit wind power to, for example, a power take-off of the shaft 18. Essentially the structure 20 responds to a change in direction of wind by turning under the control of a direction vane or similar means, such as for example a savonious rotor 22.

The turbine and rotor arrangement of the present invention can be used in many areas such as for example for driving windmills; for pumping water, oil and the like; for driving compressors or similar machinery; for generating electricity, or for driving power take off arrangements. It will however be appreciated, that the rotational moment created by rotation of the rotor and vanes of the present invention can be imparted to an elongate mounting shaft, or any other means, to allow said moment to be used or harnessed for use. It will therefore be seen that the present invention provides a particularly efficient way of utilizing wind power and for overcoming or at least minimizing some problems that have been encountered in this area up until this time.

I claim:

1. A wind turbine comprising:
    a rotor plate;
    a plurality of vanes mounted to and extending outwardly from said rotor plate, said rotor plate and said plurality of vanes being adapted to rotate about a vertical axis and each of said plurality of vanes being formed with an elongate trailing face;
    said plurality of vanes being mounted to said rotor plate in at least two pairs of oppositely mounted vanes;
    butt ends provided in connection with each of said plurality of vanes, said butt ends being juxtaposed and staggered relative to each other;
    said plurality of vanes, when viewed in transverse cross-section, each comprising a substantially U-shaped portion defining a trailing face of each of said plurality of vanes, said U-shaped portion being positioned within an outer and substantially V-shaped member which forms a leading edge of each of said plurality of vanes, said U-shaped portion diminishing in depth from the inner rounded butt end towards an outer end of each of said plurality of vanes and being dished in configuration adjacent each said outer end;
    wind deflection means for defining a primary venturi, said wind deflection means gathering and directing wind through the primary venturi and against a concave trailing face of at least one of said plurality of vanes as said rotor and the at least one of said plurality of vanes rotate away from the primary venturi; and
    a plurality of secondary venturiis formed between the juxtaposed, staggered and rounded butt ends of said plurality of vanes;
    whereby wind passes through said primary ventrui to be directed against and along the elongate concave trailing face of said at least one of said plurality of vanes as they rotate away form said primary venturi, the wind being further directed radially inwardly of said at least one of said plurality of vanes for passage through said plurality of secondary venturiis to be directed along the elongate concave trailing face of one or more opposite vanes rotating toward said primary venturi.

2. A wind turbine as claimed in claim 1, wherein said wind deflection means is movably mounted relative to said rotor plate and vanes.

3. A wind turbine as claimed in claim 1, wherein said plurality of vanes when viewed in plan, are each of a substantially curvilinear configuration.

* * * * *